United States Patent Office 2,806,416
Patented Sept. 17, 1957

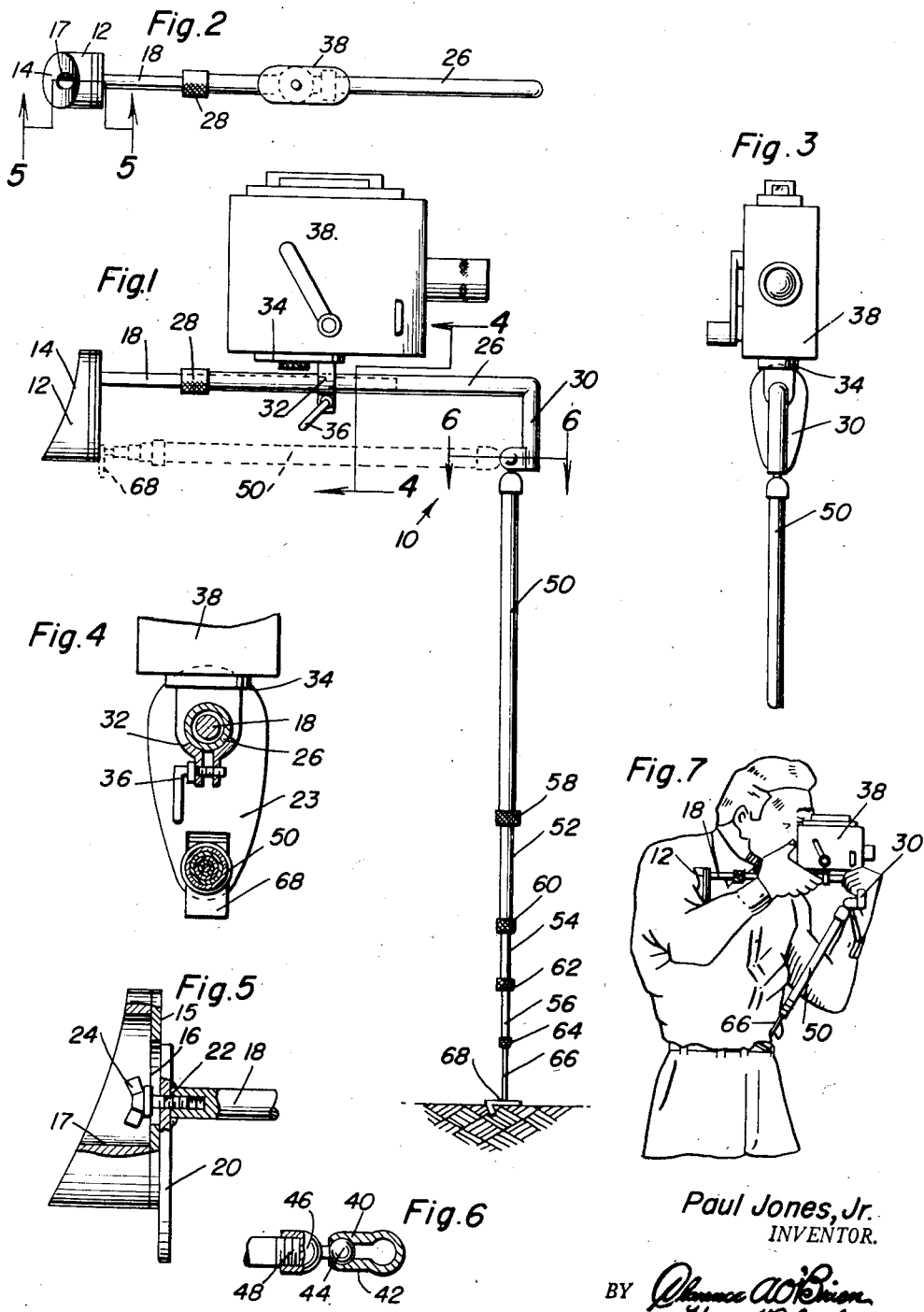

2,806,416

GUN STOCK CAMERA SUPPORT

Paul Jones, Jr., Alliance, Nebr.

Application November 1, 1954, Serial No. 465,956

3 Claims. (Cl. 95—86)

This invention relates to a support for a camera or the like, and has for its primary object the provision of means for supporting a camera in a highly stable manner.

A further object of the invention resides in the provision of a gun stock design camera support which is very comfortable to use and which can be readily and easily adjusted for use by persons of varying size.

Another object of the invention lies in the telescoping stabilizing brace which can be folded completely out of the way or which can be used alternatively as a body brace or as an elongated ground engaging brace which in conjunction with the shoulder stock and the body of the person using the invention forms a tripod support.

Still another object of the invention lies in the means provided for vertically adjusting the shoulder stock with respect to the rod attached thereto which is telescopically received in a substantially L-shaped member one portion of which forms a hand grip.

Still further objects and features of this invention reside in the provision of a gun stock design camera support that is strong and durable, simple in construction and manufacture, which can be produced from various readily available materials at a relatively low cost, and which provides a firm and stable mounting for a camera or like instrument.

These, together with the various ancillary objects and features of the invention which will become apparent as the following description proceeds, are attained by this gun stock design camera support, a preferred embodiment of which has been illustrated in the accompanying drawings, by way of example only, wherein:

Figure 1 is a side elevational view of the invention shown with a camera operatively installed thereon;

Figure 2 is a top plan view of the invention;

Figure 3 is a front end elevational view of the major portions of the invention shown with the camera installed thereon;

Figure 4 is an enlarged vertical sectional detail view as taken substantially along the planes of the line 4—4 in Figure 1 when the telescoping brace is in the dotted line position shown;

Figure 5 is an enlarged sectional detail view illustrating the means for adjustment of the shoulder stock;

Figure 6 is an enlarged sectional detail view as taken substantially along the plane of line 6—6 in Figure 1 illustrating the ball swivel joint connection between the hand grip and the telescopic brace; and Figure 7 is a perspective view of the invention shown in operative use.

With continuing reference to the accompanying drawings wherein like reference numerals designate similar parts throughout the various views, reference numeral 10 generally designates the gun stock design camera support comprising the present invention. This support 10 includes a shoulder stock 12 having one surface 14 thereof configurated to conform to the shape of a person's shoulder. The shoulder stock 12 includes a vertical plate 15 provided with a vertical slot 16 therein and a recess portion 17 for a purpose subsequently to become apparent.

A rod 18 having a plate 20 appended thereto, as by welding or the like, is positioned against the shoulder stock 12 and a threaded fastener 22 preferably provided with a wing head 24 in the recess portion 17 and engageable with plate 15 is threadedly secured in the rod 18 thus adjustably holding the shoulder stock 12 against the plate 20 in a vertically adjusted position.

The rod 18 is received within a tubular L-shaped member 26 and adjustably held in place by a knurled extension lock 28 of conventional construction, in an obvious manner. The L-shaped member 26 includes a vertically extending portion 30 which forms a hand grip.

Secured on the horizontal portion of the member 26 is a clamp member 32 to which a camera mount 34 is appended, the clamp means 32 being controlled by threaded member 36 whereby the mount 34 may be adjusted longitudinally on the member 26, as may be desired. A camera 38 of any desired configuration and construction may be readily supported on the plate 34 and may be affixed thereto in any convenient manner.

Secured to the lower end of the hand grip 30 are a pair of ears 40 and 42 having concave portions forming a seat for the sphere 44, thus forming a ball joint connection for a fitting 46 to which is threadedly secured, as at 48, the upper end of a telescopic brace 50. The telescopic brace 50 has a plurality of portions, as at 52, 54 and 56 each telescopically adjustable within each other and adapted to be locked in position by means of a conventional extension lock, such as are indicated at 58, 60, 62 and 64. A downwardly extending leg portion 66 terminates in a foot portion 68 which is adapted to be engaged in the ground or, as is shown in Figure 7, in the belt or other portion of the body of the user.

Besides being useful for engaging the ground or the body of the user, the telescopic brace 50 may be collapsed and then positioned so that the foot 68 will engage the plate 20 or the shoulder stock 12, as may be desired, to position the support 50 in a manner so that it is completely folded out of the way and positioned so as to prevent encumbering the user. Further, it is to be recognized that when the camera support is so arranged, the device occupies a very small compass, thereby permitting more convenient transportation, as may be desired.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A camera support comprising a shoulder stock having a rod attached thereto, a substantially L-shaped member having a horizontal rod receiving tube and a vertical hand grip, means telescopingly adjustably securing said rod in said tube, a camera mount longitudinally adjustable on said tube, and a brace swivelly attached to said hand grip and engageably supportable on said shoulder stock, on a ground support surface, or adjacent the body of a user of the device, said brace being of telescopic construction, said brace having a ground engaging foot engageable with said shoulder stock.

2. A camera support comprising a shoulder stock having a rod attached thereto, a substantially L-shaped member having a horizontal rod receiving tube and a vertical hand grip, means telescopingly adjustably securing said rod in said tube, a camera mount longitudinally adjustable on said tube, and a brace swivelly attached to said hand grip and engageably supportable on said shoulder stock, on a ground support surface, or adjacent the body of a user of the device, said rod being vertically adjustable with respect to said shoulder stock, said brace being of telescopic construction.

3. A camera support comprising a shoulder stock having a rod attached thereto, a substantially L-shaped member having a horizontal rod receiving tube and a vertical hand grip, means telescopingly adjustably securing said rod in said tube, a camera mount longitudinally adjustable on said tube, and a brace swivelly attached to said hand grip and engageably supportable on said shoulder stock, on a ground support surface, or adjacent the body of a user of the device, said rod being vertically adjustable with respect to said shoulder stock, said brace being of telescopic construction, said rod being vertically adjustable with respect to said shoulder stock.

References Cited in the file of this patent

UNITED STATES PATENTS 2,483,711   Roos _____ Oct. 4, 1949

FOREIGN PATENTS 687,588   Great Britain _____ Feb. 18, 1953